United States Patent [19]

Kobayashi et al.

[11] Patent Number: 4,811,653
[45] Date of Patent: Mar. 14, 1989

[54] VACUUM BOOSTER ENCLOSURE

[75] Inventors: Michio Kobayashi; Kazunori Senoh, both of Higashi-matsuyama-shi, Japan

[73] Assignee: Jidosha Kiki Co., Ltd., Tokyo, Japan

[21] Appl. No.: 315,807

[22] Filed: Oct. 28, 1981

[30] Foreign Application Priority Data

Nov. 12, 1980 [JP] Japan .................... 55-159143

[51] Int. Cl.[4] ................... F16J 3/02; B60T 13/56; F01B 19/00
[52] U.S. Cl. ................................................ 92/98 D
[58] Field of Search ............ 92/98 R, 98 D, 169 R, 92/99; 220/293, 298

[56] References Cited

U.S. PATENT DOCUMENTS

| 2,969,046 | 1/1961 | Kellogg et al. | 60/547 |
| 3,109,346 | 11/1963 | Julow | 92/98 D |
| 3,146,682 | 9/1964 | Price et al. | 220/298 |
| 4,202,462 | 5/1980 | Imber | 220/293 |
| 4,296,680 | 10/1981 | Ohta et al. | 92/98 D |
| 4,333,580 | 6/1982 | Sweigart, Jr. | 220/293 |

Primary Examiner—Robert E. Garrett
Assistant Examiner—George Kapsalas
Attorney, Agent, or Firm—Flynn, Thiel, Boutell & Tanis

[57] ABSTRACT

A pair of shells which form a booster are coupled together by an improved structure. One of either the inner periphery of the opening of the first shell or the outer periphery of the second shell is formed with a projection which projects radially toward the other shell and which is received in a recess formed therein. The engagement between the projection and the recess positively prevents a relative rotation between the shells, and thus avoids the sole reliance upon the resilience of a diaphragm held therebetween, as has been required in the prior art construction. A high accuracy in shaping the shells is thereby not required, facilitating the quality control and allowing a reduction in the manufacturing cost.

4 Claims, 2 Drawing Sheets

VACUUM BOOSTER ENCLOSURE

BACKGROUND OF THE INVENTION

1. Field of the Invention

The invention relates to a vacuum booster enclosure including a pair of shells coupled together, and more particularly, to an improvement of the structure which couples the pair of shells together.

2. Description of the Prior Art

A booster such as a brake booster, a clutch booster or the like generally comprises a pair of shells which are coupled together to define a shell structure. Referring to FIG. 1 which shows an example of the structure which couples the shells together, there is shown a brake booster 1 including a front or a first shell 2 and a rear or a second shell 3. A diaphragm 4 which is to be received within the shell structure has its periphery held between the first and the second shells 2, 3 as the latter are coupled together.

The first shell 2 is generally cylindrical in configuration and is closed at one end. Specifically, adjacent its open end, it includes a cylindrical portion 5 which is formed with a step or rim 6 so that the inner diameter of the cylindrical portion 5 at its open end is slightly greater than the inner diameter of a portion thereof which is inwardly spaced from the open end thereof. As shown clearly in FIGS. 2A and 2B, a plurality of circumferentially spaced claws 7 project radially inwardly along the inner periphery of the opening of the first shell 2.

On the other hand, the second shell 3 is generally disc-shaped, and includes a peripheral portion in which an annular groove 8 which is open in the radially outward direction is formed for receiving the peripheral edge of the diaphragm 4. The diameter of the second shell 3, as measured across the radially extending peripheral edges, coincides with the inner diameter of the outermost enlarged portion of the first shell 2 which is located radially outwardly of the rim 6. A plurality of notches 9, which are equal in number to the number of the claws 7, are formed in the peripheral edge of the second shell 3 in circumferentially spaced apart relationship so as to avoid an interference with the claws 7 when the shells 2, 3 are fitted together.

To couple the first and the second shells 2, 3 together, the peripheral edge of the diaphragm 4 is initially fitted into the annular groove 8 formed in the second shell 3. Subsequently, after the notches 9 formed in the second shell 3 are circumferentially aligned with the claws 7 formed on the first shell 2, the second shell 3 is fitted into the first shell 2. When the second shell 3 has entered the first shell 2, the shells 2, 3 are rotated relative to each other about their axes. Thereupon, the first shell 2 holds the second shell 3 between the claws 7 and the rim 6 while simultaneously holding the peripheral edge of the diaphragm 4. In this manner, the resilience of the diaphragm 4 permits the shells 2, 3 to be locked against rotation.

In the conventional booster 1 mentioned above, the clamping action between the shells 2, 3 solely depends upon the resilience of the diaphragm. Accordingly, both shells must be shaped to a high accuracy to ensure that these shells cannot be rotated relative to each other. This presents a difficulty with respect to quality control, thus preventing a reduction in the manufacturing cost from being achieved.

SUMMARY OF THE INVENTION

It is an object of the invention to provide a booster coupling mechanism which does not require shaping a first and a second shell to a high accuracy, thus facilitating quality control and providing an inexpensive arrangement.

It is another object of the invention to facilitate the shaping of the shells.

Other objects and advantages of the invention will become apparent from the following description with reference to the attached drawings.

DESCRIPTION OF THE PREFERRED EMBODIMENTS

Figure 1:
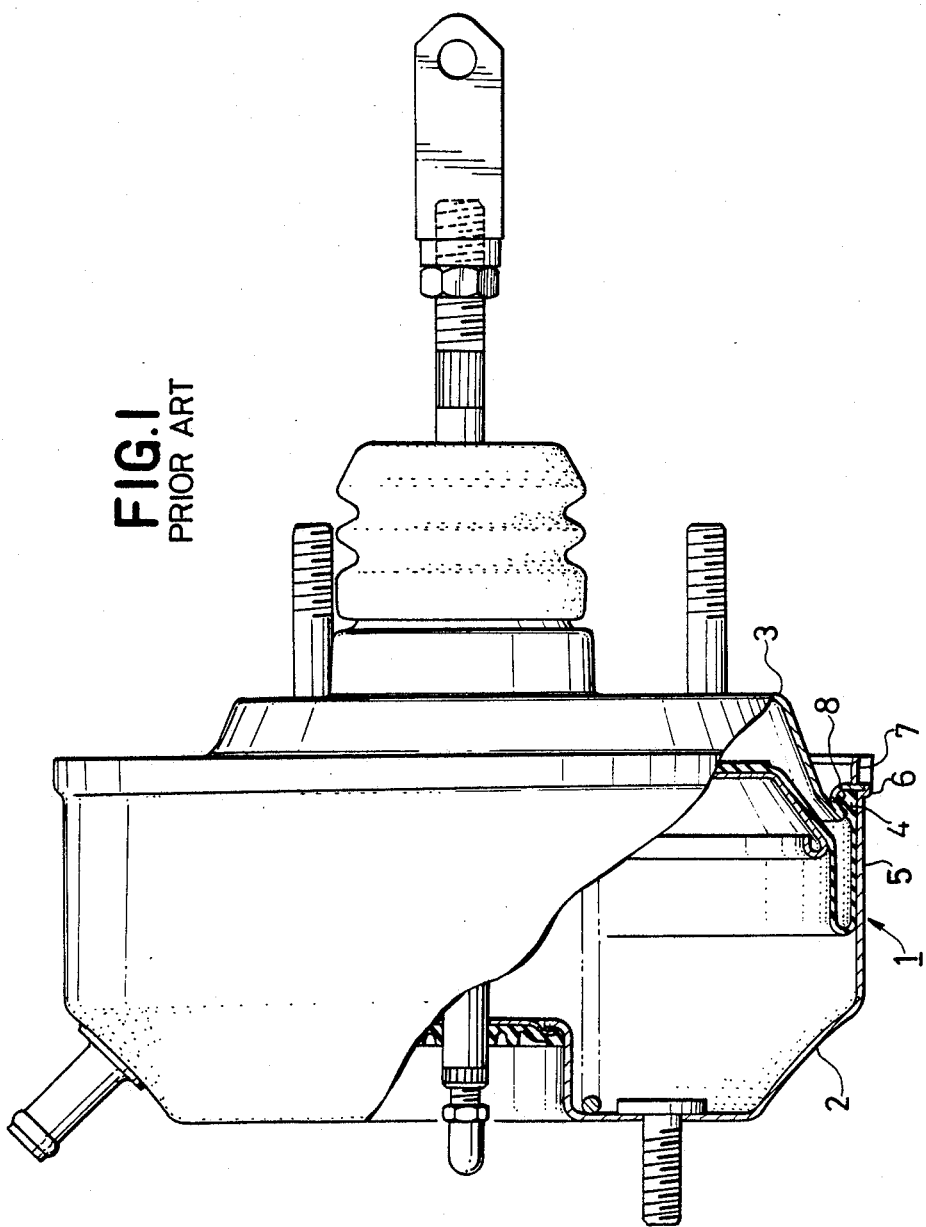
FIG. 1 is a side view, partly in section, of a conventional booster.
Figure 2A:
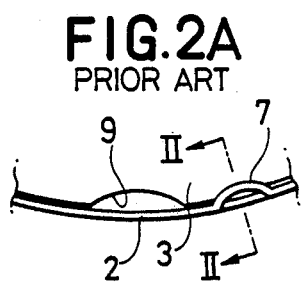
FIGS. 2A and 2B are a front view and a cross section taking along the line II—II shown in FIG. 2A, respectively of a conventional booster.
Figure 2B:
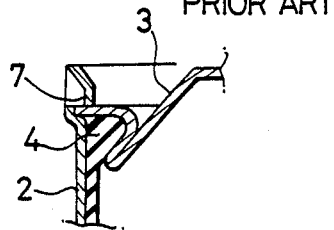

Referring to the drawings, several embodiments of the invention will be described below. It is to be understood that parts which are identical in construction to parts used in the conventional arrangement described above are designated by like reference characters without further description.

Figure 3A:
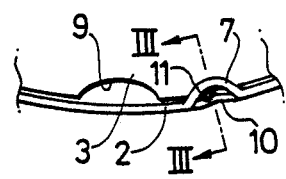
FIGS. 3A and 3B are a front view and a cross section taken along the line III—III shown in FIG. 3A, respectively of essential parts of a booster according to a first embodiment of the invention.
Figure 3B:
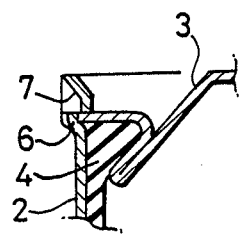

FIGS. 3A and 3B illustrate a first embodiment of the invention. In this embodiment, a second shell 3 is secured in place by having its peripheral edge disposed in abutment against a step or rim 6 formed on a first shell 2. Along the inner periphery of the opening, the first shell 2 is formed with at least one small projection 10 which extends toward the second shell 3 or radially inwardly. In a corresponding manner, the outer periphery of the second shell 3 is formed with at least one small recess 11 which can receive the projection 10 therein. The circumferential location of the projection 10 need not be aligned with the claw 7, but when it is formed at the circumferential position shown, both the claw 7 and the projection 10 can be simultaneously shaped.

With the described arrangement, when the second shell 3 is held by the claw 7 of the first shell 2, the projection 10 is fitted into the recess 11, and such fitting engagement combined with the resilience of the diaphragm 4 effectively prevents a relative rotation between the shells 2, 3. Accordingly, it is unnecessary to shape the both shells 2, 3 to a high accuracy as required in the prior art practice, enabling them to be manufactured at a reduced cost.

Figure 4A:
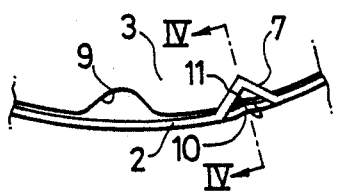
FIGS. 4A and 4B are a front view and a cross section taken along the line IV—IV shown in FIG. 4B, respectively of essential parts of a booster according to a second embodiment of the invention.
Figure 4B:
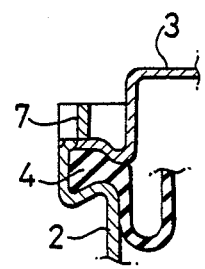
Figure 5:
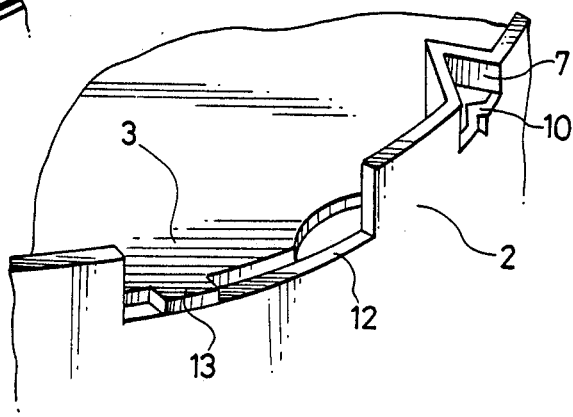
FIG. 5 is a perspective view of essential parts, illustrating the structure which couples the shells of the second embodiment together.

FIGS. 4A, 4B and 5 illustrate a second embodiment of the invention. As shown in FIG. 5, the upper rim of the first shell 2 is formed with a circumferentially and axially extending notch 12, against the upper surface of which a radially outwardly extending projection 13 from a second shell 3 bears to secure the second shell 3 in place. Also in this embodiment, a small projection 10 may be formed on the inner periphery of the opening of the first shell 2 to be received in a small recess 11 formed in the second shell, thus more reliably preventing a relative rotation between the shells 2, 3.

Alternatively, the recess 11 may be formed in the first shell 2 to receive the projection 10 which is formed on the second shell 3, in the opposite manner from that illustrated in the above two embodiments. As a further alternative, rather than arranging the projection 10 and the recess 11 so as to be located opposite to each other in the radial direction of the shells 2, 3, they may be located to be opposite to each other in the axial direction of both shells.

While the invention has been described above in connection with several embodiments thereof, it should be understood that a various changes and modifications can be made therein without departing from the spirit and the scope of the invention as defined by the appended claims.

What is claimed is:

1. A booster enclosure comprising
a first, generally cylindrical shell which is open at one end and closed at the other end thereof, said first shell having a plurality of circumferentially spaced apart, radially inwardly extending claws formed on the rim of said first shell defining said open end thereof;
a second shell having a peripheral edge being of a size adapted for insertion into and close fitting contact within said open end of said first shell, said second shell having a plurality of circumferentially spaced-apart grooves formed in said peripheral edge, said grooves being alignable with said claws such that said second shell can be inserted into said first shell by aligning said grooves therewith causing said claws to pass through said grooves as said second shell is inserted into said first shell so that the mutually adjacent ends are overlapped;
resilient means positioned between said overlapped end portions, said resilient means being adapted to exert force on said end portions in both radial and axial directions; and
interlocking means comprising mating small projection means formed on at least one of the inner periphery of said first shell at said open end thereof and said peripheral edge, and small groove means formed on the other of said inner periphery and said peripheral edge of said second shell;
whereby when said second shell has been inserted into said first shell, said first and second shells can then be rotated relative to one another such that said claws are no longer in alignment with said grooves and thus extend over said peripheral edge of said second shell, said small projection means being of a small size sufficient to allow said rotation of said first and second shells past said small projection means, said rotation ceasing when said small projection means interlocks with said small groove means, such that said first and second shells are locked together by said interlocking means acting in cooperation with said claws and said resilient means.

2. A booster enclosure as claimed in claim 1, wherein said peripheral edge of said second shell is formed with radially outwardly extending second projection means, and said open end of said first shell adjacent said peripheral edge which includes said claws, further includes circumferentially elongated second groove means aligned with said second projection means such that said second projection means is inserted by axial movement into said elongated second groove means when said first and second shells are fitted together and moves arcuately along the circumferential length of said elongated second groove means as said first and second shells are rotated relative to one another.

3. A booster enclosure as claimed in claim 1, wherein said small projection means comprises a plurality of projections formed in matching alignment with said claws on said open end of said first shell, and said small groove means comprises a plurality of grooves formed at corresponding locations on said peripheral edge.

4. A booster enclosure as claimed in claim 1, wherein said peripheral edge is in contact with a radially enlarged portion of said open end of said first shell which forms a step, whereby said peripheral edge is held between said claws on one side thereof and said step and said resilient means on the other side thereof when said shells are interlocked.

* * * * *